(12) United States Patent
Kendall et al.

(10) Patent No.: US 10,514,302 B2
(45) Date of Patent: Dec. 24, 2019

(54) METHOD FOR MEASURING A TEMPERATURE OF A MOLTEN METAL BATH

(71) Applicant: HERAEUS ELECTRO-NITE INTERNATIONAL N.V., Houthalen (BE)

(72) Inventors: Martin Kendall, Zonhoven (BE); Robert Charles Whitaker, Chesterfield (GB); Marc Straetemans, Hechtel-Eksel (BE); Dominique Feytongs, Hasselt (BE); Jack Childs, Worksop (GB)

(73) Assignee: HERAEUS ELECTRO-NITE INTERNATIONAL N.V., Houthalen (BE)

( * ) Notice: Subject to any disclaimer, the term of this patent is extended or adjusted under 35 U.S.C. 154(b) by 167 days.

(21) Appl. No.: 15/828,758

(22) Filed: Dec. 1, 2017

(65) Prior Publication Data
US 2018/0180484 A1 Jun. 28, 2018

(30) Foreign Application Priority Data
Dec. 22, 2016 (GB) .................................. 1621979.2

(51) Int. Cl.
*G01K 1/00* (2006.01)
*G01J 5/00* (2006.01)
(Continued)

(52) U.S. Cl.
CPC ............... *G01J 5/0821* (2013.01); *G01J 5/10* (2013.01); *G01K 1/022* (2013.01); *G01K 1/026* (2013.01)

(58) Field of Classification Search
USPC .................................. 374/139, 131, 121, 208
See application file for complete search history.

(56) References Cited

U.S. PATENT DOCUMENTS

| 4,128,414 A | 12/1978 | Hater et al. |
| 5,585,914 A | 12/1996 | Yamasaki et al. |

(Continued)

FOREIGN PATENT DOCUMENTS

| DE | 3707322 | 6/1988 |
| DE | 3712619 | 10/1988 |

(Continued)

OTHER PUBLICATIONS

British Search Report issued in Great Britain Application No. 1621979.2 dated May 24, 2017.

*Primary Examiner* — Mirellys Jagan
(74) *Attorney, Agent, or Firm* — Blank Rome LLP (57) ABSTRACT

A method for feeding a cored wire into molten metal contained in a vessel comprises positioning the cored wire at a first position wherein a leading tip of the cored wire is proximate an entry point of the vessel, the entry point being above a surface of the molten metal, the cored wire comprising an optical fiber and a cover laterally surrounding the optical fiber; feeding the cored wire at a first speed for a first duration from the first position to a second position wherein the leading tip of the cored wire is immersed within the molten metal and lies within a measuring plane, such that a leading tip of the optical fiber projects from the cover and is exposed to the molten metal; and subsequently feeding the cored wire at a second speed for a second duration to take a first measurement of the molten metal.

15 Claims, 5 Drawing Sheets

(51) Int. Cl.
*G01J 5/08* (2006.01)
*G01J 5/10* (2006.01)
*G01K 1/02* (2006.01)

(56) References Cited

U.S. PATENT DOCUMENTS

| | | | |
|---|---|---|---|
| 5,988,545 A | 11/1999 | King | |
| 6,770,366 B2 | 8/2004 | Riche et al. | |
| 7,748,896 B2 | 7/2010 | Dams et al. | |
| 7,891,867 B2 | 2/2011 | Dams et al. | |
| 7,906,747 B2 | 3/2011 | Poulalion | |
| 8,034,344 B2 | 10/2011 | Perlin et al. | |
| 8,282,704 B2 | 10/2012 | Poulalion | |
| 2010/0020845 A1* | 1/2010 | Dams | G01J 5/02 374/139 |
| 2014/0321504 A1* | 10/2014 | Neyens | G01J 5/004 374/139 |

FOREIGN PATENT DOCUMENTS

| | | |
|---|---|---|
| DE | 19623194 | 7/1997 |
| DE | 19916235 | 9/2000 |
| EP | 0176152 A1 | 4/1986 |
| EP | 0646778 | 4/1995 |
| EP | 0806640 | 11/1997 |
| EP | 2799824 | 11/2014 |
| JP | S 6052507 | 3/1985 |
| JP | S6219727 A | 1/1987 |
| JP | H0979909 A | 3/1997 |
| JP | H 09101206 | 4/1997 |
| JP | H 09243459 | 9/1997 |
| JP | H 09304185 | 11/1997 |
| JP | H10185698 A | 7/1998 |
| JP | 2007309932 A | 11/2007 |
| JP | 2014219395 A | 11/2014 |
| JP | 2015212693 A | 11/2015 |

\* cited by examiner

METHOD FOR MEASURING A TEMPERATURE OF A MOLTEN METAL BATH

CROSS REFERENCE TO RELATED APPLICATION

This application claims the benefit of GB Application No. 1621979.2, filed Dec. 22, 2016, the contents of which are incorporated by reference herein in its entirety.

TECHNICAL FIELD

The present invention relates to a method for measuring the temperature of a molten metal bath and, more particularly, a method for measuring the temperature of a molten metal bath in an electric arc furnace by an optical fiber surrounded by a cover.

BACKGROUND OF THE DISCLOSURE

An optical fiber with a cover which may be used to measure the temperature of molten metal is disclosed in British Patent Application No. 1518208.2 filed on Oct. 14, 2015. The covered optical fiber is unwound from a spool and fed to the molten metal bath through a guide pipe. When a portion of the optical fiber is immersed into a molten metal at a predicable depth, the radiation light emitted from the molten metal at blackbody conditions is such that the intensity of the radiation using a photo-electric conversation element mounted on the opposite end of the immersed consumable optical fiber can be used to determine the temperature of the molten metal. During this measurement, the immersed portion of the optical fiber is consumed by the molten metal bath, such that continued temperature information is available only by providing a continued supply of fresh optical fiber.

Devitrificaton of a quartz optical fiber will result in an attenuation of the transmitted light, and thus result in an error proportional to the extent of this damage. It is well known in the art that the immersed optical fiber must be consumed at a rate which is equal to or faster than the rate of devitrification of the optical core in order to result in accurate performance. A variety of schemes to feed consumable optical fibers into molten metal all are designed to expose the optical fiber core to molten metal before its devitrification. However, the devitrification rate is dependent upon the structure of the optical cored wire and the actual conditions of the molten metal bath, such as its temperature, its fluid motion, the amount and type of slag covering the molten metal bath, as well as the thermal environment of the metallurgical vessel to which the optical fiber is exposed to before and after each measurement cycle. Multiple feeding schemes are likely to arise due to the numerous variety of conditions to which the optical fiber will be exposed during its introduction into and through various metallurgical vessels at various times during metals processing.

Thus, a problem to be solved is establishing a specific method to feed optical cored wire into a molten metal bath that is practical, that can be applied to a variety of molten metal vessels, and which takes into account the degradation of the optical fiber before, during and after its use especially when used for sequential measurements in a measuring sequence.

U.S. Pat. No. 5,585,914 discloses a single-metal, jacketed optical fiber that can be fed through a nozzle into a molten metal bath at a rate of 5 mm/sec for 10 seconds. The immersed fiber is then held in the immersed position for 20 seconds. When this method is carried out in a cyclic fashion, the method may be considered continuous. To obtain this type of operation, the single-metal, jacketed optical fiber is fed from a point below the metal surface through a nozzle in the sidewall of a vessel that requires a continuous gas shrouding of 5 $Nm^3$/hour and at speed of 121 Nm/s. An advantage of this method is that the unfed optical fiber is kept cool by the gas shrouding. However, a problem associated with using the type of submersed access to molten metal, as taught by U.S. Pat. No. 5,585,914, is the ability to keep the nozzle open and free of obstruction. Once the opening is blocked, continued feeding is impossible. U.S. Pat. No. 8,038,344 discloses that additional pressure measurements should be concurrently employed with such gas purged nozzles in order to determine if the opening is blocked.

To circumvent this problem, the optical fiber can be fed into the molten metal bath from above its surface. However, this method is also not without some inherent problems. The optical fiber must transit the distance from the exit of a guide tube, through a cover of molten slag and then finally into the molten metal bath below the slag surface. In order to form the blackbody condition, which is a necessity for accurate measurements, the fiber must be immersed a minimum distance into the molten metal bath and to a location within the metallurgical vessel which is representative of the molten metal bath. During this time while the optical fiber is immersed in the molten metal bath, the metal jacket of the optical fiber is subject to radiant, convective and conductive heating. Any softening of the optical fiber can result in bending of the optical fiber out of the molten metal bath due to the buoyancy of the optical fiber, aided in some instances by fluid currents of the molten metal bath. Thus, in the harsh industrial environment of molten metal processing vessels, maintaining a predetermined depth of the optical fiber as is necessary to ensure blackbody conditions during the period of measurement, has proven to be difficult due to the inherent weakness in the prior art metal jacketed optical fiber as the temperature increases.

Multi-layered wires with steel outer coverings are used in steelworks to introduce additive substances selectively into the molten metal bath. For example, such wires are disclosed in DE 19916235 A1, DE 3712619 A1, DE 19623194 C1, and U.S. Pat. No. 6,770,366. U.S. Pat. No. 7,906,747 relates to repeatable exposure of the additive to the molten metal, particularly molten steel. The efficiency of adding these doping substances to the steel using a cored wired, a filled wire, or wire shaped additives, depends upon delivering the doping additive to a specific distance below the molten metal surface. This is accomplished by special machines and feeding methods that can payout a specific length of additive cored wire at a speed sufficient to guarantee that the destruction of the outer steel jacket, thus exposing the additive to the molten metal, will occur at a prescribed depth. Long lengths of cored wires are supplied in coils or on spools, for example as disclosed in U.S. Pat. No. 5,988,545, for integration with special wire feeding machines, for example as disclosed in EP 0806640 A2, JP H09101206A, JP 56052507A and DE 3707322 C1, in order to carry out the practical immersion of additive cored wires. The construction of optical cored wires and the used of cored wire feeding machines have benefited from the teaching of additive cored wires. However, this body of prior art is silent as how to control the immersion of an optical cored wire to expose the continuously consumable optical core to the molten metal while also addressing the devitrification rate of the optical fiber.

JP 09304185A discloses a feeding rate solution wherein the speed of fiber consumption must be greater than the rate of devitrification, thereby assuring that a fresh optical fiber surface is always available. New material is constantly fed to replace devitrified fiber and is thus suitable for receiving and passing on radiation, without radiation losses. Therefore, the method of feeding cannot be independent of the optical fiber structure itself. The optical fiber is sent out into the molten metal until a threshold of 1200° C. is achieved. The optical fiber is then stopped and the temperature is recorded. After a first period of 2 seconds, a fixed length of 10 mm of the optical fiber is fed into the molten metal bath and the temperature is again recorded. The second recorded temperature is then compared to the first recorded temperature. A comparison of the first and seconds temperatures determines if a successful measurement has been achieved or if additional cycles are needed.

Besides being a means to determine if the reading is acceptable, the speed of feeding is not specified. It has been found that in more harsh measuring environments, such as an electric arc furnace, the speed of feeding is a significant variable due to the amount of preheat that occurs above the molten metal before immersion of the optical fiber in the molten metal. In the case of multiple immersions, the thermal exposure of the optical wire occurs in the time interval between measurements. Substantial preheating by radiant exposure will promote devitrification which manifests itself in a lower than actual temperature. During metallurgical processing, the actual temperature could legitimately have decreased during the manufacturing process and not be related to the devitrification of the optical fiber. Thus, known methods are insufficient, because there is no separation between an actual change in the temperature due to the process and a change in the measured temperature due to devitrification. Additionally, the internal environment of a melting vessel could easily exceed the preset temperature even before immersion of the optical fiber. The rate of devitrification is the controlling factor for accurate temperature measurements, and thus feeding the optical fiber is a function of both the optical fiber construction and the environment to which it is exposed before, during and after its immersion.

Feeding methods that rely upon measuring a threshold temperature before actuation neglect the fact that after a reading, the remaining optical cored wire or metal jacketed optical fiber will become devitrified by heat conduction in the interval between the present immersion and the future immersion. Devitrification will lead to incorrect light gathering and therefore erroneous temperatures leading to improper feeding judgements. Therefore, in order to practice a method of optical wire feeding, the cored optical fiber remnant of the prior measurement must be considered so as not to influence the subsequent measurements. Some prior art has recognized this limitation. For example, JP H09243459A teaches a corrective action in that damaged immersible optical fibers should be cut away from the supply coil each time to provide an un-devitrified fiber. However, this reference provides no indications of how one is to determine the extent of devitrification. In practice, this also requires additional equipment to cut away the damaged portion of the fiber and, in the case where the immersion is from above the molten metal bath, the fiber must be withdrawn through a layer of slag. In turn, the slag may collect on the fiber, thereby interfering with the removal from the vessel and eventually the cutting mechanism.

U.S. Pat. No. 7,748,896 discloses an improved optical fiber device for measuring a parameter of a molten metal bath. The device comprises an optical fiber, a cover laterally surrounding the optical fiber, and a detector connected to the optical fiber, wherein the cover surrounds the optical fiber in a plurality of layers, one layer comprising a metal tube and an intermediate layer arranged beneath the metal tube. The intermediate layer comprises a powder or a fibrous or granular material, wherein the material of the intermediate layer surrounds the fiber in a plurality of pieces. The intermediate layer is formed of silicon dioxide powder or aluminum oxide powder and may contain a gas producing material.

A counterpart patent, U.S. Pat. No. 7,891,867, discloses a method of feeding such optical cored wires by determining an initial temperature response interval. The speed of fiber fed is determined by the change in detected temperature during a first thermal response interval compared to a change in detected temperature during a second following time interval. The speed of optical feeding is therefore optimized during feeding and adjustable by parameters that are independent of the structure of the optical fiber. Also, only the identification of the thermal response time within two time intervals are required. While adequate for spot measurements, this method of controlling the feeding rate fails to account for the fact that once begun, repeated measurements do not exhibit an initial thermal response interval as described. According to this prior art method, the heating rate and hence the thermal response are a result of the feeding speed, slag temperatures as well as melt temperature of the particular furnace. However, the optical fiber will receive radiation before it is immersed into the metal. The very low temperatures of the first interval described in this prior art method, in most circumstances will occur out of the molten metal bath, and therefore the first interval is not a characteristic of the optical fiber response to the metal but rather to that of the thermal conditions of the melting furnace.

Thus, there is a need for a predictable immersion methodology that is suitable for a first immersion and then repeated immersions that do not depend upon a cool down period between them or achievement of a starting threshold.

It is well known to those skilled in the art that the bath level within the melting furnace is subject to variation due to the contour and wear of the refractory lining of the vessel. This presents a problem in that the installation position is mostly fixed to the physical structure of the vessel, while the ideal immersion depth and location within the bath are mostly variable. Since the rate of devitrification, as previously described, is a function of the amount of heat input to the optical core before, during and after its molten metal immersion, the multiple heat sources of the application environment must also be considered to be variable since the distances that the optical cored wire must travel to become immersed will vary according to each vessel geometry and refining process.

Thus, there is a need for a simple yet effective means to control the feeding of improved optical cored wire that brings an un-devitrified optical fiber to a measuring location that is capable of an initial single immersion and closely followed multiple immersions for use in metallurgical vessels, especially electric-arc furnaces.

SUMMARY OF THE INVENTION

The present invention relates to a method for measuring the temperature of a molten metal bath, particularly a molten steel bath, by an optical fiber. The method utilizes multiple rates of feeding an optical cored wire (i.e., a cored wire including an optical fiber at its center) over predetermined distances to measure the temperature of a molten metal bath by controlling the feeding profile of the immersed consumable core optical fiber. The method also employs a technique to determine the necessary length to be dispensed of the optical cored wire, regardless of the wear on the vessel refractory surfaces. This same technique is suitable to predict the length of devitrified optical cored wire that has been despooled into the furnace from the preceding measurement. The present invention is suitable for continuous temperature detection during molten metal processing or during a discrete time interval of importance during the processing of molten metal, such that temperature information is available on demand by semi-continuous feeding of the consumable optical fiber whose accuracy is dependent upon the rate of consumption of the fiber by the molten metal.

In summary, the following embodiments are proposed as particularly preferred in the scope of the invention:

Embodiment 1

Method for feeding a cored wire into molten metal, preferably molten steel, contained in a vessel, the method comprising:
positioning the cored wire at a first position wherein a leading tip of the cored wire is proximate an entry point of the vessel, the entry point being above a surface of the molten metal, the cored wire comprising an optical fiber and a cover laterally surrounding the optical fiber;
feeding the cored wire at a first speed for a first duration from the first position to a second position wherein the leading tip of the cored wire is immersed within the molten metal and lies within a measuring plane, such that a leading tip of the optical fiber projects from the cover and is exposed to the molten metal; and
once the leading tip of the optical fiber projects from the cover and is exposed to the molten metal, feeding the cored wire at a second speed for a second duration to take a first measurement of the molten metal.

Embodiment 2

Method according to the preceding embodiment, characterized in that the method further comprises:
after feeding the cored wire at the second speed, suspending feeding of the cored wire, such that the leading tip of the cored wire melts back to the surface of the molten metal to a third position;
subsequently feeding the cored wire at the first speed from the third position back to the second position; and
once the leading tip of the optical fiber projects from the cover and is exposed to the molten metal, feeding the cored wire at the second speed to take a second measurement of the molten metal.

Embodiment 3

Method according to any of the preceding embodiments, characterized in that the method further comprises taking a temperature measurement of the molten metal while the cored wire is being fed at the second speed.

Embodiment 4

Method according to any of the preceding embodiments, characterized in that the first speed is higher than the second speed.

Embodiment 5

Method according to any of the preceding embodiments, characterized in that the second speed is equal to a rate of consumption of the optical fiber by its immersion in the molten metal.

Embodiment 6

Method according to any of the preceding embodiments, characterized in that the first speed is between 8 and 12 meters/minute, preferably 10 meters/minute.

Embodiment 7

Method according to any of the preceding embodiments, characterized in that the second speed is between 4 and 7 meters/minute, preferably 5 meters/minute.

Embodiment 8

Method according to any of the preceding embodiments, characterized in that the cover includes an outer metal jacket formed of low carbon steel.

Embodiment 9

Method according to any of the preceding embodiments, characterized in that the outer metal jacket has a thickness of 1 mm.

Embodiment 10

Method according to any of the preceding embodiments, characterized in that the outer metal jacket has a thickness greater than or less than 1 mm, wherein the second speed is calculated according to the following equation:

$$\text{Second Speed} = (5*(T)^{-1})/(MP/1800),$$

wherein T is the thickness of the outer metal jacket in mm and MP is the melting point of the material of the outer jacket in Kelvin.

Embodiment 11

Method according to any of the preceding embodiments, characterized in that the cored wire is fed by a feeding device comprising a controller for controlling the feeding speed of the cored wire.

Embodiment 12

Method according to any of the preceding embodiments, characterized in that the cored wire is fed by a feeding device comprising motor drive and a controller for controlling the feeding speed of the cored wire, wherein a rate of power consumption of the motor drive changes upon immersion of the leading tip of the cored wire in the molten metal, such that upon detection of the change in the rate of power consumption, the controller adjusts the feeding speed of the cored wire from the first speed to the second speed

BRIEF DESCRIPTION OF DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION

The present invention relates to a method for feeding an optical cored wire into a molten metal bath contained in a metallurgical vessel.

Figure 1:
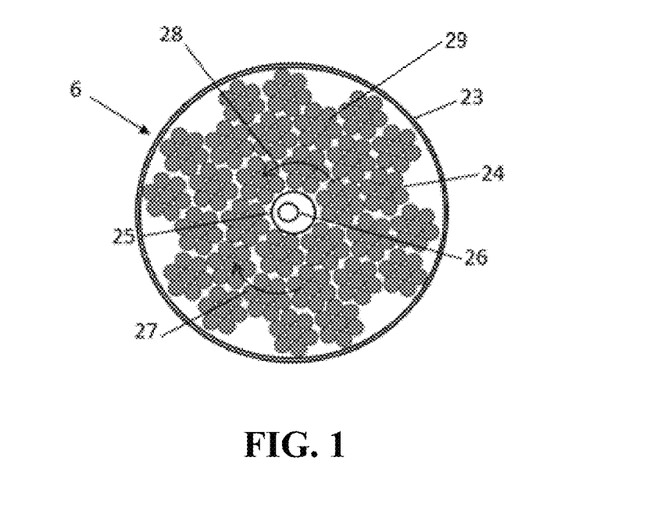
FIG. 1 is a stylized cross-sectional view of an optical cored wire showing an intermediate layer of a rope-like form about a plastic jacketed optical core fiber and an outer metal jacket, in accordance with an embodiment of the present invention.

Referring to FIG. 1, there is shown an optical cored wire 6 in accordance with one embodiment of the invention. The optical cored wire 6 comprises an outer protective tube 23, and more particularly an outer metal jacket 23, surrounding an intermediate material 24. Preferably, the intermediate material 24 is in the form of a plurality of strands 24. The plurality of strands 24 are preferably voluminized and formed from a plurality of E-glass fibers.

The outer metal jacket 23 is preferably formed from metal with a Fe content greater than 50%. More preferably, the outer metal jacket 23 is formed of the material disclosed in British Patent Application No. 1518208.2 filed on Oct. 14, 2015, namely low carbon steel. Preferably, the outer metal jacket 23 has a thickness of 1 mm.

The plurality of strands 24 surround an inner protective tube 25, and more particularly an inner plastic tube 25, also called a buffer tube, which houses (i.e., surrounds) an optical fiber 26 therein. The outer diameter of the optical fiber 26 is preferably smaller than the inner diameter of the plastic tube 25. The strands 24 may be twisted in both the clockwise 27 and the counter-clockwise 28 directions in alternating layers around the plastic tube 25 to form a rope-like form 29 (or more simply, a rope). The optical fiber 26 is in the center of the rope 29. The optical fiber 26 is preferably a graded index 50/125μ or 62.5/125μ. The term "optical core" as used herein may refer to both the inner quartz core, either 50 or 62.5μ, of the optical fiber 26 or the entire optical fiber 26, 125μ, which is the core of the optical cored wire 6.

Figure 2:
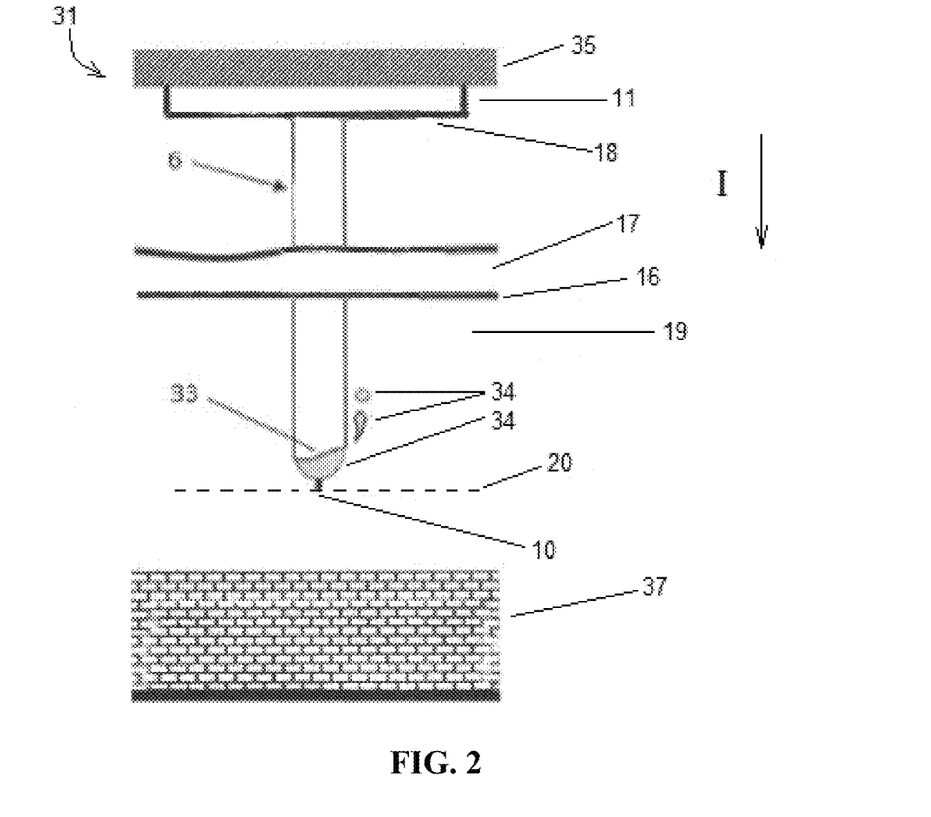
FIG. 2 is a cross-sectional view of a metallurgical vessel having a roof and a floor containing molten metal and slag, wherein an optical cored wire is in a measuring position in the metallurgical vessel, such that a portion of the outer metal jacket has melted to form a molten glob of the intermediate layer, thereby exposing the optical core for measuring, in accordance with an embodiment of the present invention.

Referring to FIGS. 2-3, the method comprises feeding the optical cored wire 6 into a metallurgical vessel 31 containing molten metal 19 covered by a slag layer 17, in order to measure the temperature of the molten metal 19. FIG. 4 shows a general feeding and temperature measuring system 14 in accordance with an embodiment of the present invention. The system 14 includes a sitting coil 2 and/or a roll stand 2a, a wire feeder 4, a guide tube 5, an immersion nozzle 11, and a connector 9 which connects the guide tube 5 to the immersion nozzle 11. The guide tube 5 may extend the full distance between the wire feeder 4 and the immersion nozzle 11 or, as shown in FIG. 4, may extend for only a portion of this distance. The immersion nozzle 11 is a concentrically constructed double tube, cooled by gas entering between the tubes at inlet 7 (see FIG. 4).

During a feeding process, the optical cored wire 6 is de-spooled from either the sitting coil 2 or the roll stand 2a by action of the wire feeder 4 and moved into the inner passage of the guide tube 5 via the inlet 12 of the guide tube 5. Then, the optical cored wire 6 is fed through the internal tube of the immersion nozzle 11, while air is simultaneously fed through the inlet 7 to travel in the space between the internal tube and the external tube of the immersion nozzle 11.

The air is preferably at a pressure of approximately 6 bar. The air preferably travels through the space between the internal tube and the external tube of the immersion nozzle 11 and exits the immersion nozzle 11 at its outlet 18. The absolute amount of cooling air should be selected so as to prevent the slag 17 from entering and closing off the outlet 18 of the immersion nozzle 11, even when the slag is foamed. The height of a foamed slag is not shown in any of the figures. However, in a foaming slag condition, the outlet 18 will be engulfed by the slag layer 17.

Although the immersion nozzle 11 may be located in a variety of positions, the immersion nozzle 11 is preferably positioned such that it has a direct line access to the surface 16 of the molten metal 19 starting from a position above the molten metal bath 19. More preferably, the immersion nozzle 11 is positioned such that the outlet 18 of the nozzle 11 coincides with (and more particularly is positioned just below) the entry point (also referred to herein as the top end or roof 35) of the metallurgical vessel 31.

The metallurgical vessel 31 may be an electric arc furnace, a ladle, a tundish or any vessel, or section of a vessel known to those skilled in the art for the processing of molten metal. For purposes of describing a preferred embodiment of the invention, the vessel 31 is described as having a roof 35 and a floor 37, but it will be understood that the vessel 31 need not have a roof because any container capable of holding molten metal is applicable to the method of the present invention.

Figure 3A:
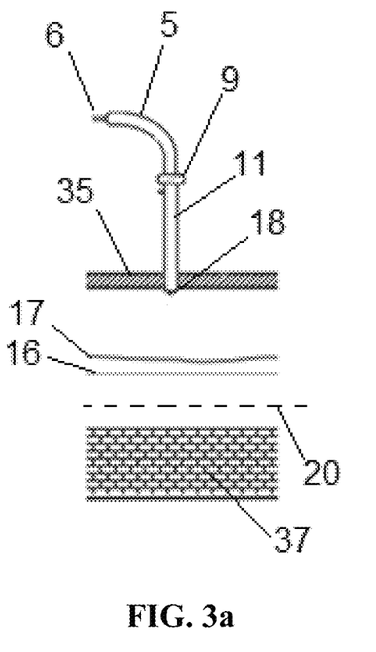
FIG. 3a is a cross-sectional view of metallurgical vessel shown in FIG. 2, wherein the optical cored wire is in a pre-immersion initial position.

FIG. 3a shows the initial starting position of the optical core wire 6 before the first immersion of a sequence of measurements. More particularly, in the initial starting position, the optical cored wire 6 is contained within the guide tube 5 and the immersion nozzle 11. Preferably, a leading tip 6a (not visible in FIG. 3a, but visible in FIG. 3c) of the optical cored wire 6 is positioned at the outlet 18 of the immersion nozzle 11, and thus proximate the entry point (e.g., the roof 35) of the metallurgical vessel 31.

The term "initial" within the context of carrying out this method refers to the first measurement of a sequence of measurements within a single refining batch.

Figure 3B:
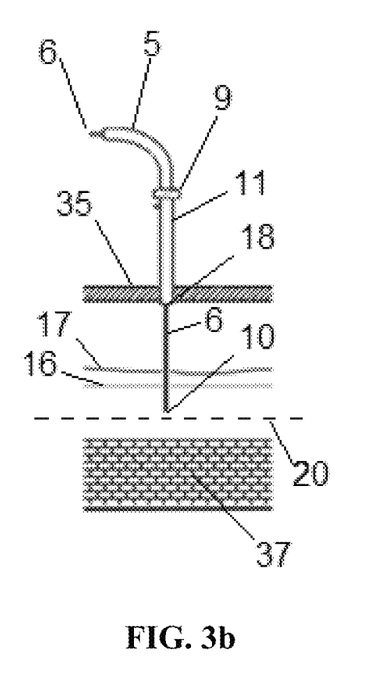
FIG. 3b is a cross-sectional view of metallurgical vessel shown in FIG. 2, wherein the optical cored wire has been immersed into the molten metal to its measuring position.

From this initial starting position, the optical cored wire 6 is fed at a first speed, referred to herein as a first bridge speed, to a second position, also referred to herein as a measuring position, as shown in FIGS. 2 and 3b. In the measuring position, the optical cored wire 6 has exited the outlet 18 of the immersion nozzle 11 and has entered the vessel 31. More particularly, a leading portion of the optical cored wire 6 has been plunged through the slag layer 17 and has become immersed in the molten metal bath 19.

Due to the high temperature of the molten metal 19, a leading edge 33 of the outer metal jacket 23 of the optical cored wire 6 progressively melts, as shown in FIG. 2. The progressively melting leading edge 33 of the outer metal jacket 23 recedes opposite the immersion direction I, while the intermediate layer 24 surrounding the optical fiber 26 melts into a glob 34 which is gradually removed by the heat of the molten metal 19. As a result, a tip 10 of the optical fiber 26 protrudes from the glob 34 and forms a projection which is exposed to the molten metal. In the measuring position, the optical fiber tip 10 lies in a plane 20 below the surface 16 of the molten metal 19. Thus, during the first bridge speed, the tip 6a of the optical cored wire 6 traverses or spans the distance between the point of entrance of the vessel 31 (e.g., the roof 35) and a measuring point (i.e., in plane 20) beneath the molten metal surface 16.

The transition between the initial starting position and the measurement position, as shown in FIGS. 3a-3b, represents a first measurement of a sequence of measurements within one batch of steelmaking, in accordance with the method of the present invention. During and then after the first measurement in a sequence, the optical cored wire 6 which had been cooled within the guide tube 5 and the immersion nozzle 11 is now exposed to the radiant heat of the metallurgical vessel 31 for a distance from the outlet 18 of the immersion nozzle 11 to the covering slag 17 and then conductively heated to a point (i.e., in plane 20) below the surface 16 of the molten metal bath 19.

The first bridge speed allows for a predetermined length of optical cored wire 6 to be fed, where the predetermined length is equal to the distance between the outlet 18 of the immersion nozzle 11 and the measuring location in plane 20. More particularly, the first bridge speed must be fast enough to ensure that the projecting and exposed tip 10 of the optical fiber 26 arrives at and can be submerged in the molten metal bath 19 containing sufficient heat, such that the molten slag 17 covering the molten metal 19 does not quickly chill around its face and the outer metal tube 23. Otherwise, an abundance of solidified slag on the outer metal jacket 23 would impede the exposure of the optical core fiber 26 to the molten metal 19 during immersion. The remaining portion of the optical fiber 26 which is within the hot environment of the metallurgical vessel 31, but not immersed in the molten metal bath 19, is still protected by the thermal isolating intermediate layer 24 as well as by the outer metal jacket 23. Thus, the remaining portion of the optical fiber 26 immediately before immersion is in a vitreous condition, as is essential for accurately measuring the temperature of the molten metal bath.

The first bridge speed is preferably between 8 and 12 meters/minute, and more preferably the first bridge speed is 10 meters/minute, which ensures the fast immersion and disposal of the leading damaged portion of the optical cored wire 6.

Upon reaching the measuring position shown in FIGS. 2 and 3b (i.e., after the tip 10 of the optical fiber 26 has become immersed to a certain depth in the molten metal bath 19), the optical cored wire 6 is fed at a second speed, referred to herein as the immersed feed speed or immersed speed. More particularly, upon reaching the measuring position shown in FIG. 3b, the drive motor of the feeding system 4 quickly changes from the first bridge speed to the immersed feed speed. The designations of the bridge speed or the immersed feed speed serve only to distinguish between the two separate feeding speeds which are based on the position of the optical tip 10.

The portion of the optical fiber 26 that has entered the molten metal 19 is progressively consumed and replenished at a rate equal to the immersed feed rate. The first bridge speed is preferably higher than the immersed feed speed. This is because the immersed feed speed is the rate of consumption of the optical fiber 26, while the rate of supply of the optical cored wire 6 (i.e., the first bridge speed) must compensate for the rate at which the optical fiber 26 is destroyed, devitrified by exposure to the hot environment of the vessel 31. This replenishment by the second speed maintains the optical tip 10 at a desired immersion depth or slightly changing depth.

The immersed feed speed is thus dependent upon the rate of consumption of the optical fiber 26 while immersed under the surface 16 of the molten metal 19. More particularly, the immersed feed speed is equal to the receding speed of the leading edge 33 of the outer metal jacket 23, so as to maintain the immersion depth of the optical fiber 26 at the measuring plane 20. The immersed feed speed is between 4 and 7 meters/min, preferably 5 meters/minute, which is sufficient to compensate for the rate of optical cored wire consumption.

The immersed feed speed is continued for a set time interval. During the immersed feed speed, the temperature measurement is taken. After the set time interval, the drive motor is stopped and the optical cored wire 6 is suspended. In this suspended state, even after a brief period of time, the leading tip 6a of the optical cored wire 6 will melt back to the metal surface 16, as shown in FIG. 3c.

Figure 3C:
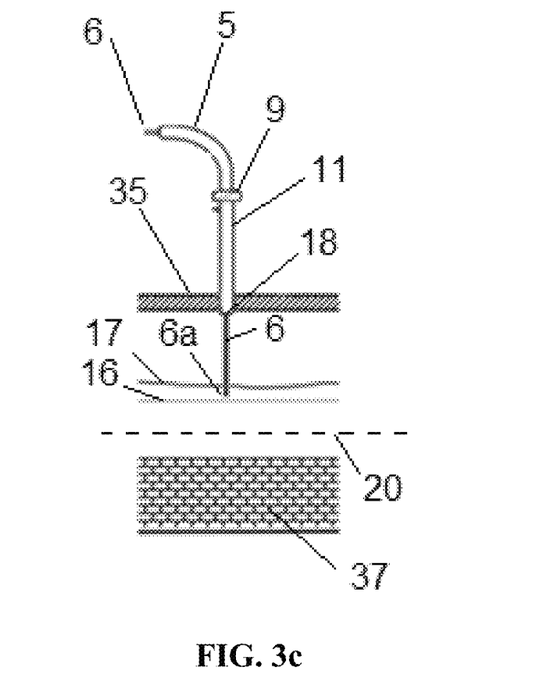
FIG. 3c is a cross-sectional view of metallurgical vessel shown in FIG. 2, wherein the optical cored wire has been consumed and is suspended above the molten metal awaiting a subsequent measurement.
Figure 4:
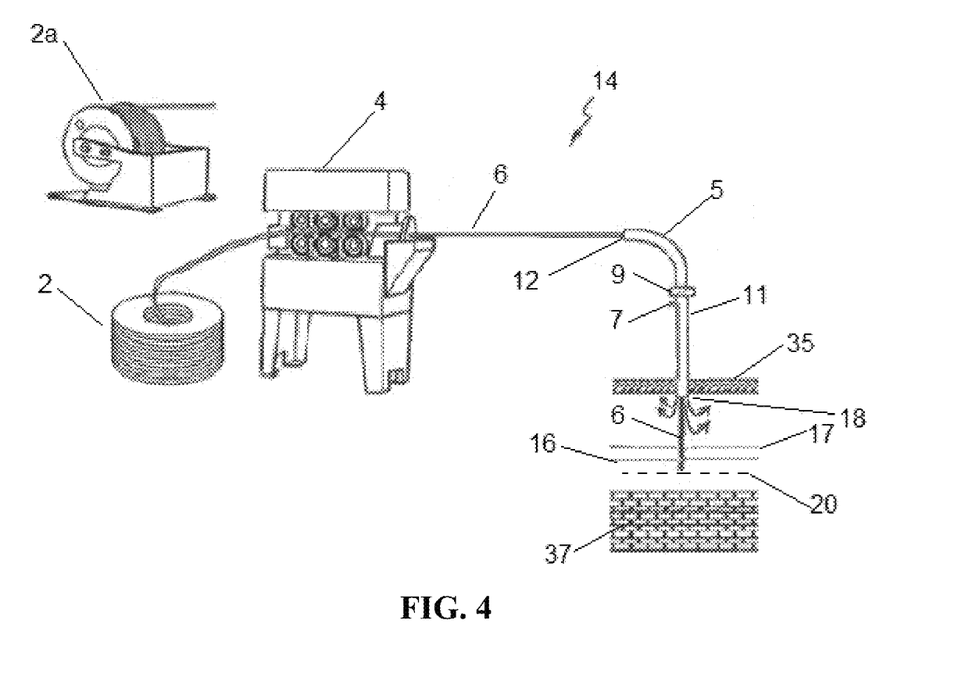
FIG. 4 depicts a schematic of a system for measuring the temperature of molten metal which is suitable for use with the optical cored wire shown in FIG. 1, in accordance with an embodiment of the present invention.

For a further measurement, the optical cored wire 6 moves from the suspended position shown in FIG. 3c, where the leading tip 6a is at or slightly above the surface 16 of the molten metal 19, toward the measuring plane 20 again at the first bridge speed. Thus, the first bridge is selected to be fast enough to discharge a length of the optical fiber 26 into the metal for disposal, not measurement, since it will have been heat damaged by the internal environment of vessel 31 even though it was not immersed. The first bridge speed in subsequent measurements of a sequence of measurements allows for a predetermined length of optical cored wire 6 to be discharged, where the discharged length is equal to the distance between the outlet 18 of the immersion nozzle 11 and the measuring location in plane 20.

Figure 3D:
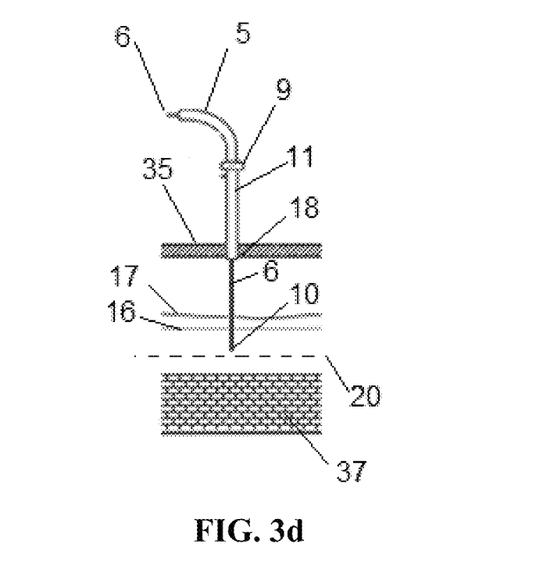
FIG. 3d is a cross-sectional view of metallurgical vessel shown in FIG. 2, wherein the optical cored wire has been re-immersed in the molten metal during a subsequent measurement.

As soon as the exposed tip 10 of the optical fiber 26 arrives at the measuring plane 20, as shown in FIG. 3d (i.e., identical to the initial measuring position shown in FIG. 3b), the feeding rate is changed to the immersed feed speed. More particularly, the drive control quickly changes to the immersed feed speed. Again, the immersed feed speed is continued for a set time interval, after which time the drive motor is stopped and the optical cored wire 6 is again suspended. Thus, the method of feeding the optical cored wire 6 recognizes that subsequent measurements within the same refining batch must remove optical cored wire that is damaged by the prior immersion before carrying out a following measurement. For each of the measurements subsequent to the first measurement, it is preferable that the optical cored wire 6 is fed at a rate equal to the first bridge speed, while the immersed feed speed remains the same. However, in some circumstances, for each of the measurements subsequent to the first measurement, the optical cored wire 6 may be fed at a rate that is higher than the first bridge speed.

During the production process, it is advantageous to have repeated measurements, especially at the last stages of the process which are typically not less than 30 seconds apart nor more than one minute from the prior measurement. Essentially, two measuring circumstances exist in the method of the present invention, whereas the prior art has addressed such methods as if there were only one measurement circumstance. The first measurement starts from the initial condition in which the optical cored wire 6, and more particularly the optical tip 10, is at a remote or isolated location relative to the molten metal 19 and is initially below the devitrification temperature. For all measurements subsequent to the first measurement, until the removal of the molten metal from the vessel 31, unless the optical cored wire 6 is withdrawn, the optical cored wire 6 evolves into a state where the unconsumed portion of the optical cored wire 6 outside of the immersion nozzle 11 yet still inside the vessel heats due to its exposure to the environment of the vessel 31, while the immersed portion of the optical cored wire 6 melts back to the metal level 16. Therefore, the starting condition for subsequent measurements is that the exposed portion of the optical cored wire 6 is already heated, while the portion of the optical cored wire 6 still within the immersion nozzle 11 is cold. Withdrawing the unused portion is not practical, since slag adhering to the outer metal jacket 23 of the optical cored wire 6 will freeze and by increasing its outer diameter, can exceed the internal dimensions of the immersion nozzle 11.

A suitable feeding system 4 will, at a minimum, have an accurate optical core wire speed detection means, because when the drive motor is engaged at a given speed for a specific time interval, the duration of that time interval is an exact measure of the amount of optical cored wire dispensed.

Thus, in one embodiment, the feeding system 4 for carrying out the method of the present invention comprises a feeding control which controls the feeding speed of the optical cored wire 6 so that the speed will be reduced when the cored wire 6 arrives at the molten metal bath 19. In a preferred embodiment, the power consumption of the motor drive for feeding the optical cored wire 6 is used an indicator for controlling the speed for feeding the optical cored wire 6 into the molten metal bath 19. The arrival of the optical cored wire 6 at the molten metal 19 comes with a change of the power consumption of the motor drive. The detection of a corresponding change of the power consumption may be used as a signal for reducing the feeding speed from the first bridge speed to the immersed feed speed. The power consumption may also be used indirectly, for example, for measuring a distance from a preset position at the outlet 18 of the immersion nozzle 11 to the floor 37 of the metallurgical vessel 31 or an obstruction within the feeding path.

Also, the amount of optical cored wire 6 dispensed from a given point can be directly related to the spatial position of any portion of the optical cored wire 6, for example the optical tip 10. Thus, the location of the measuring tip 10 within the molten metal bath 19 can be directly controlled by driving the optical cored wire 6 at a specific speed for a specific time. The present method recognizes that the rate of devitrification is not constant and adapts a two speed feed pattern that compensates for the thermal condition of the optical cored wire 6 at the time of its use, since this thermal condition is dictated by both the ambient environment of the metallurgical vessel 31 and the prior measurement.

In order to practice the method of this invention utilizing all types of metallurgical vessels, thus overcoming a weakness of the prior art, it is advantageous to have a rudimentary knowledge of the geometry of the vessel and the molten metal contained within it. Thus, referring to FIG. 5, there is shown a non-specific vessel 31 having a roof portion 35 and a floor portion 37 with non-specific geometries. This vessel 31 is used as an example to apply the method of the present invention, in order to arrive at a feeding schedule which is representative of the inventive method.

At the time of the initial installation of the system 4, the optical cored wire 6 is advanced utilizing suitable feeding equipment comprising a cored wire speed control, until the leading tip 6a of the optical cored wire 6 is approximately equal to the outlet position 18 of the immersion nozzle 11. That is, the starting position, or initial position, D0, of the tip 6a of optical cored wire 6 is taken as a point within the immersion nozzle 11 near its outlet 18 (i.e., proximate the entry point of the vessel 31). This starting position corresponds to the configuration shown in FIG. 3a. This location can be determined visually or set by extending a random length of the optical cored wire 6 from the immersion nozzle 11 and allowing it to burn back during one melting cycle, such as in an electric arc furnace melting process. A suitable position detector can be zeroed to store the value of D0 after the first cycle, since it is dependent upon the physical geometry of the vessel 31 and the position of the immersion nozzle outlet 18 which is substantially equal to the underside of the vessel roof 35. In the absence of a roof, the outlet 18 of the immersion nozzle 18 is used as the initial starting location. In the absence of an immersion nozzle 11, the outlet of the guide tube 5 is used as the initial starting location.

The angle of entry of the optical cored wire 6 can be between 0 and 60 degrees depending upon the construction details of the vessel 31 and does not change the starting position D0. Preferably, the angle of entry of the optical cored wire 6 is perpendicular to the surface 16 of the molten metal 19. For this exemplary vessel 31, perpendicular to the surface 16 of the molten metal 19 means that the angle of entry of the optical cored wire 6 is 0 degrees. The existence of an immersion angle only changes the calculation of the linear distance which is known mathematics. Further, feeding of the optical cored wire 6 proceeds until the optical cored wire tip 6a makes contact with the floor of the vessel corresponding to position D3. This linear distance is thus D3–D0. This distance can be determined visually when the vessel 31 is empty, but typically monitoring the initial upswing torque response of the drive motors of the feeding machines has provided acceptable information. The determination of positions D0 and D3 can be made at any time while the metallurgical vessel 31 is empty or at times where the vessel 31 contains only a small amount of residual molten metal. Periodically, the position D3 should be determined between the refractory lining service intervals in order to compensate for the changing contour of the furnace bottom 37, the importance of which is described herein in greater detail. For the purpose of this exemplary vessel, the position of D0 is considered to be 0 meters and the position of D3 is equal to 1.8 meters, meaning that the distance between D0 and D3 is equal to 1.8 meters. In the case of a vessel 31 having a floor 37 located in excess of 2 meters below the normal molten metal level 16 of the vessel 31, such as in a ladle, distance between D0 and D3 is assigned to be 2 meters as a constant.

The optimum molten metal bath level 16, which is the height of the metal sitting upon the floor 37 of the vessel 31, is approximately known for each metallurgical vessel 31 by its design and method of operation. In practice, the actual height of the molten metal 19 over the bottom or floor 37 is not a fixed value, because of changes in the contour of the vessel walls due to erosion or excessive skull or refractory build-up, and/or angled operation of the vessel 31. As such, these changes will vary the displacement volume of the molten metal within the vessel 31.

There are numerous methods known to determine molten metal bath level. For example, one can determine the approximate molten metal distance at any furnace angle from a position above the molten metal level by allowing a measuring bar immersed into the metal to burn away and then by measuring the distance of the remaining bar and a reference point. This method is known in the art and when applied to the exemplary vessel 31, the distance from the reference point D0, which corresponds to the vessel roof 35 and is considered to be 0 meters, to a position D1, which corresponds to the molten metal surface 16, is 1 meter. In the case of a vessel 31 without a roof, D1 can be just as easily determined from reference point D0, since D0 also corresponds to the outlet 18 of the immersion nozzle 11 (or, in the absence of the immersion nozzle 11, the outlet of the guide tube 5), regardless of whether or not it is within a roof section or suspended above an open bath 19. Position D1 can also be determined in-situ by the electronic conductivity between the molten bath 19 and a conductive portion of the optical cored wire 6. Such measurements are known in the art and do not restrict the practice of the present invention.

The position of D2, which corresponds to a point lying in the measuring plane 20, as is most suitable for optical cored wires 6 employed for the method of the invention, is simply calculated as being equal to 0.5*(D3−D1)+D1. In the exemplary vessel 31 of FIG. 5, the position of D2 is 1.4 meters. That is, measuring plane 20 extends at a distance of 1.4 meters from the starting position D0 of the optical cored wire 6.

All set points D0, D1, D2 and D3 are therefore calculable for each metallurgical vessel geometry and molten metal circumstance.

The following examples provide exemplary conditions according to the method of the invention, but it will be understood that many other conditions are possible within the scope of the invention.

Example 1

Figure 5:
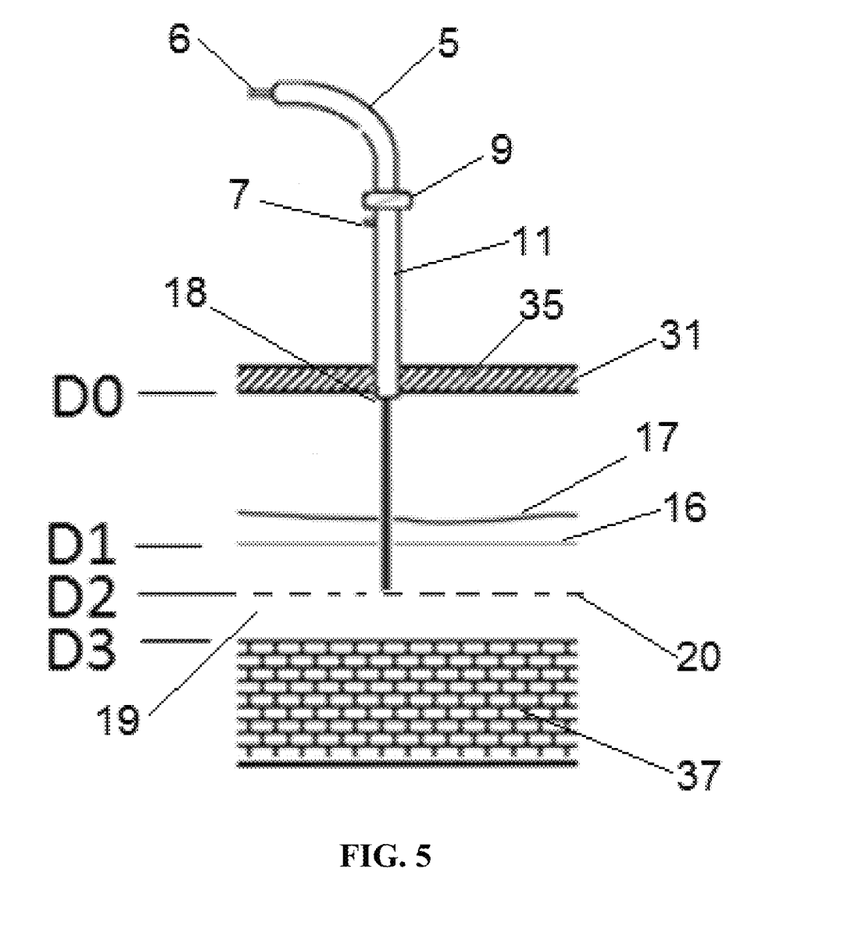
FIG. 5 depicts an example of a metallurgical vessel with a roof and a floor for use with the system of FIG. 4, in accordance with an embodiment of the present invention.

An optical cored wire 6 having a graded index 62.5/125μ, 0.9 mm semi-tight plastic jacketed optical fiber 26 with an intermediate layer 24 of low melting E-glass surrounded by a 1 mm steel outer jacket 23 is used on a cored wired feeding system 4 and fed to the exemplary metallurgical vessel shown in FIG. 5 by the preferred two feed speed regime of the present invention, thereby resulting in the following procedure for temperature measurement.

A first bridge speed is between 8-12 meters/minute, preferably 10 meters/minute. The first bridge speed is initiated automatically at a specific accumulated power consumption of the electric furnace 31, but can also be a manual input. To place the measuring tip 10 of the optical fiber 26 at the measuring point D2 in plane 20, the drive motor is preferably operated at the first bridge speed of 10 meters/minute for a duration of 8.5 seconds. In order to balance the consumption of the optical cored wire 6, while maintaining the measuring tip 10 at the position D2, once the measuring tip 10 is immersed to measuring plane 20, the feed speed is quickly lowered to an immersed feed speed of 4-7 meters/minute, preferably 5 meters/minute, for a duration of 5 seconds. During this second feeding stage, while the optical measuring tip 10 is immersed in molten metal, a measurement, preferably a temperature measurement, is taken. Thus, the duration for which the immersed feed speed is continued corresponds to a stable detection interval for one discrete measurement (i.e., a measurement interval), although an actual determination may be achieved in less time. Although other measurement interval durations can be used, sufficient temperature detection can be obtained within this time interval and thus results in economical minimum material consumption.

The drive motor is then purposefully stopped after the 5 second measurement interval, in order to allow melting back of all the immersed optical cored wire 6 in the bath 19, after which time, a new measurement can be performed. The optical output, as the optical cored wire 6 melts back towards the slag/metal interface, can be monitored for additional information.

From the above description, one skilled in the art would understand that once the distance that the optical cored wired 6 must bridge to reach the molten metal 19 is known and the heating and consumption rates of the optical cored wire 6 are known, the time of drive motor engagement can be varied with small variation in the drive speeds, without departing from the invention, yet being applicable to variations in the types of molten metal vessels. One will appreciate that at constant drive speeds, the distance travelled is a function of the power on time and the optimum distances from the immersion nozzle outlet 18 to the measuring position D2 in plane 20 can be translated to time as follows for this example where D2 is 1.4 meters.

Example 1 represents a particularly preferred embodiment of the invention.

Example 2

An optical cored wire 6 having a graded index 62.5/125μ, 0.9 mm semi-tight plastic jacketed optical fiber 26 with an intermediate layer 24 of low melting E-glass surrounded by a 0.5 mm stainless steel outer jacket 23 is used on a cored wired feeding system 4 and fed to the exemplary metallurgical vessel shown in FIG. 5 by the preferred two feed speed regime of the present invention, thereby resulting in the following procedure for temperature measurement.

In order to utilize the method of the present invention for an outer metal jacket 23 having a thickness other than 1 mm and/or formed of other materials, the immersed feed speed may be adjusted according to the following equation:
Immersed feed speed=(5*(thickness of outer metal jacket 23)^−1)/(melting point K/1800), where the melting point of the outer jacket 23 material is given in Kelvin and the thickness of the outer jacket 23 is in mm.

In the present example, the melting temperature of the material of the outer metal jacket 23 is 1723 K.

A first bridge speed is between 8-12 meters/minute, preferably 10 meters/minute. The first bridge speed is initiated automatically at a specific accumulated power consumption of the electric furnace 31, but can also be a manual input. To place the measuring tip 10 of the optical fiber 26 at the measuring point D2 in plane 20, the drive motor is preferably operated at the first bridge speed of 10 meters/minute for a duration of 8.5 seconds. In order to balance the consumption of the optical cored wire 6, while maintaining the measuring tip 10 at the position D2, once the measuring tip 10 is immersed to measuring plane 20, the feed speed is adjusted to an immersed feed speed of 5 meters/minute, for a duration of 5 seconds. During this second feeding stage, while the optical measuring tip 10 is immersed in molten metal, a measurement, preferably a temperature measurement, is taken. Thus, the duration for which the immersed feed speed is continued corresponds to a stable detection interval for one discrete measurement (i.e., a measurement interval), although an actual determination may be achieved in less time.

The drive motor is then purposefully stopped after the 5 second measurement interval, in order to allow melting back of all the immersed optical cored wire 6 in the bath 19, after which time, a new measurement can be performed. An additional 5 seconds of detection may follow this immersion interval, while monitoring the optical output as the optical cored wire 6 melts back towards the slag/metal interface.

Pre-determined set points for feeding the optical cored wire are determined by practical measurement of distances at the actual installation site. The uncomplicated practice of the present method economically benefits the operators of melting vessels since the re-occurring measurement set point D2 is determined at the time of the method and can be simply adjusted to the wear of the vessel refractories, thus always having the optimum measuring process regardless of furnace shape. The method employed purposefully discharges, rather than attempts to recover, the portion of optical cored wire that will eventually devitrify during the interval between measurements. Each distance parameter is dependent upon the point of use and can compensate for variations, installation to installation, and at operating conditions within a single installation. The method removes the complications of cutting devitrified used optical fiber from the coil, thus eliminating the necessary equipment and maintenance.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method for feeding a cored wire into a molten metal contained in a vessel, the method comprising:
    positioning the cored wire at a first position wherein a leading tip of the cored wire is proximate an entry point of the vessel, the entry point being above a surface of the molten metal, the cored wire comprising an optical fiber and a cover laterally surrounding the optical fiber;
    feeding the cored wire at a first speed for a first duration from the first position to a second position wherein the leading tip of the cored wire is immersed within the molten metal and lies within a measuring plane, such that a leading tip of the optical fiber projects from the cover and is exposed to the molten metal; and
    once the leading tip of the optical fiber projects from the cover and is exposed to the molten metal, feeding the cored wire at a second speed for a second duration to take a first measurement of the molten metal.

2. The method according to claim 1, characterized in that the method further comprises:
    after feeding the cored wire at the second speed, suspending feeding of the cored wire, such that the leading tip of the cored wire melts back to the surface of the molten metal to a third position;
    subsequently feeding the cored wire at the first speed from the third position back to the second position; and
    once the leading tip of the optical fiber projects from the cover and is exposed to the molten metal, feeding the cored wire at the second speed to take a second measurement of the molten metal.

3. The method according to claim 1, characterized in that the method further comprises taking a temperature measurement of the molten metal while the cored wire is being fed at the second speed.

4. The method according to claim 1, characterized in that the first speed is higher than the second speed.

5. The method according to claim 1, characterized in that the second speed is equal to a rate of consumption of the optical fiber by its immersion in the molten metal.

6. The method according to claim 1, characterized in that the first speed is between 8 and 12 meters/minute.

7. The method according to claim 1, characterized in that the second speed is between 4 and 7 meters/minute.

8. The method according to claim 1, characterized in that the cored wire is fed by a feeding device comprising a controller for controlling the feeding speed of the cored wire.

9. The method according to claim 1, characterized in that the cored wire is fed by a feeding device comprising a motor drive and a controller for controlling the feeding speed of the cored wire, wherein a rate of power consumption of the motor drive changes upon immersion of the leading tip of the cored wire in the molten metal, such that upon detection of the change in the rate of power consumption, the controller adjusts the feeding speed of the cored wire from the first speed to the second speed.

10. The method according to claim 1, wherein the molten metal is molten steel.

11. The method according to claim 1, characterized in that the first speed is 10 meters/minute.

12. The method according to claim 1, characterized in that the second speed is 5 meters/minute.

13. The method according to claim 1, characterized in that the cover includes an outer metal jacket formed of low carbon steel.

14. The method according to claim 13, characterized in that the outer metal jacket has a thickness of 1 mm.

15. The method according to claim 13, characterized in that the outer metal jacket has a thickness greater than or less than 1 mm, wherein the second speed is calculated according to the following equation:

$$\text{Second Speed} = (5*(T)^{\wedge}-1)/(MP/1800),$$

wherein T is the thickness of the outer metal jacket in mm and MP is the melting point of the material of the outer jacket in Kelvin.

* * * * *